(12) United States Patent
Lachambre et al.

(10) Patent No.: US 11,347,701 B2
(45) Date of Patent: May 31, 2022

(54) LIVE ZERO DOWNTIME MIGRATION OF DATABASES WITH DISPARATE SCHEMATA

(71) Applicant: Citrix Systems, Inc., Fort Lauderdale, FL (US)

(72) Inventors: Sheldon Lachambre, London (GB); Sebastian Amrogowicz, London (GB); William Charnell, London (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 233 days.

(21) Appl. No.: 15/895,980

(22) Filed: Feb. 13, 2018

(65) Prior Publication Data

US 2019/0251180 A1    Aug. 15, 2019

(51) Int. Cl.
*G06F 16/21* (2019.01)
*G06F 16/25* (2019.01)

(52) U.S. Cl.
CPC .......... *G06F 16/214* (2019.01); *G06F 16/211* (2019.01); *G06F 16/258* (2019.01)

(58) Field of Classification Search
CPC ..... G06F 16/214; G06F 16/211; G06F 16/258
See application file for complete search history.

(56) References Cited

U.S. PATENT DOCUMENTS

| | | | | |
|---|---|---|---|---|
| 2007/0261049 | A1* | 11/2007 | Bankston | G06F 8/65 717/170 |
| 2008/0098046 | A1* | 4/2008 | Alpern | G06F 16/24565 707/999.203 |
| 2008/0243950 | A1* | 10/2008 | Webman | G06F 11/14 707/999.204 |
| 2015/0161182 | A1* | 6/2015 | Baeuerle | H04L 67/141 707/803 |
| 2018/0004792 | A1* | 1/2018 | Desai | G06F 16/219 |

* cited by examiner

*Primary Examiner* — Kannan Shanmugasundaram
(74) *Attorney, Agent, or Firm* — Foley & Lardner LLP

(57) ABSTRACT

Described embodiments provide systems and methods of migrating clients between databases with different schemas. A database migrator may identify a first database accessible by the client including a first data object maintained in accordance with a first schema. The database migrator may generate, using the first database, a second database including the first data object from the first database. The database migrator may store, onto the second database in accordance with a second schema, a second data object received by the first database subsequent to generation of the second database. The database migrator may convert the first data object of the second database from the first schema to the second schema. The database migrator may migrate the client from the first database to the second database responsive to the completion of storing and converting.

20 Claims, 4 Drawing Sheets

LIVE ZERO DOWNTIME MIGRATION OF DATABASES WITH DISPARATE SCHEMATA

FIELD OF THE DISCLOSURE

The present application generally relates to database synchronization. In particular, the present application relates to systems and methods for migrating databases from one schema to a different schema.

BACKGROUND

Databases may be used to store and maintain a set of data objects containing data in accordance with a schema defining an organization of the data. To migrate an existing database from one schema to another schema under current techniques, modifications of the existing database recorded in a transaction log may be replicated onto a mirror database. Such techniques, however, may result in extended periods of time during which new data may not be written to either database.

BRIEF SUMMARY

The present disclosure is directed towards systems and methods for migrating clients between databases with different schemas. A database may include a collection of data objects arranged in accordance with a schema. The schema may define a syntax specification for classifying well-formed data objects. In addition, the schema may specify a structural relationship of the data objects to one another within the database. Each data object may be queried or written onto the database in adherence to the schema. Upon request from a client, the schema of the database may be updated or otherwise modified, resulting in a change in the syntax specification or the structural relationship.

Under existing solutions, the migration of a database from one schema to another schema may rely on a transaction log for the database. The transaction log may represent a snapshot of all the contents of the current database, and may record every write or modification operation on every data object of the database up to a predefined point-in-time (e.g., when the database is copied for backup). By applying all the write and modification operations of the transaction log, a new database mirroring the previous database may be constructed, with the existing data objects updated with the new schema. This technique, however, may not allow for application of live schema changes. That is, any new write or modification operations made subsequent to the predefined point-in-time for the transaction log may be absent from the new database. Furthermore, as the migration of the database from one schema to the new schema may utilize an extended period of time, users of the database may be locked out from making further modifications during this time period.

To eliminate the lockout period stemming from existing solutions dependent on transaction logs, the present systems and methods provide for just-in-time, zero-downtime migration of databases from one schema to another. A database management system may identify an existing database (also referred to as the "source database") maintained in accordance with a prior schema. A copy of the source database may be restored to create a new database (also referred to as the "target database"). The database management system may apply changes in the schema to the data objects of the new database. In the meanwhile, the database management system may instantiate and maintain a queue to keep track of any new write or modification operations received by the existing database. The queue may be also used to track metadata of the intervening write and modification operations (e.g., location of the corresponding data object in the database). As the new schema is applied to the data objects of the new database, the database management system may process the new write or modification operations stored in the circular buffer from the time of the creation of the new database. For each operation, the database management system may determine whether the new schema is to be applied. If the operation results in a change under the new schema, the output of the operation and any associated metadata may be transformed in adherence to the new schema and loaded onto the new database. Otherwise, the output of the operation and any associated metadata may be written onto the new database without any changes. Once all the operations of the queue are processed, the database management system may migrate the client from the source database to the target database.

In this manner, the database may be migrated from one schema to another schema, seamlessly and without any disruptions in service to the users during the update, thereby improving service-level agreement (SLA) performance. Furthermore, new write and modification operations may be processed as the migration from one schema to another is occurring.

At least one aspect of this disclosure is directed to a method of migrating clients between databases with different schemas. A database migrator executing on one or more processors may identify a first database accessible by the client. The first database may include a first data object maintained in accordance with a first schema. The database migrator may generate, using the first database, a second database including the first data object from the first database maintained in accordance with the first schema. The database migrator may store, onto the second database in accordance with a second schema, a second data object received by the first database subsequent to generation of the second database. The database migrator may convert the first data object of the second database from the first schema to the second schema. The database migrator may migrate the client from the first database to the second database responsive to completing storing of the second data object onto the second database in accordance with the second schema and completing converting of the first data object of the second database from the first schema to the second schema.

In some embodiments, the database migrator may maintain a queue for a write operation corresponding to the second data object to be stored onto the first database and the second database. In some embodiments, the database migrator may store, concurrent to converting the first data object from the first schema to the second schema, an output of the write operation corresponding to the second data object onto the first database. In some embodiments, the database migrator may add, responsive to storing the output of the write operation onto the first database, metadata associated with the write operation onto the queue for converting the second data object in accordance with the second schema. The metadata may specify a location of the second data object received by the first database.

In some embodiments, maintaining the queue may further include maintaining the queue including a buffer for a plurality of write operations. In some embodiments, the database migrator may insert each write operation of the plurality of write operations and metadata corresponding to the write operation into the buffer subsequent to processing of the write operation. In some embodiments, the database migrator may identify, from a queue including a write operation corresponding to the second data object stored onto the first database. The write operation may be subsequent to a backup time at which the second database is generated. In some embodiments, storing the second data object onto the second database may further include processing the write operation of the queue subsequent to the backup time to store the second data object onto the second database in accordance with the second schema.

In some embodiments, the database migrator may maintain a queue including a plurality of queries. The plurality of queries may include a write operation corresponding to the second data object. In some embodiments, the database migrator may determine that the write operation corresponding to the second data object involves changing a schema of the second data object to the second schema. In some embodiments, storing the second data object onto the second database may include storing the second data object corresponding to the write operation in accordance with the second schema, responsive to determining that the write operation involves changing a schema of the second data object to the second schema.

In some embodiments, the database migrator may identify, from a queue for maintaining a write operation corresponding to the second data object, metadata associated with the write operation specifying a location of the second data object received by the first database. In some embodiments, the database migrator may determine that the metadata associated with the write operation is to be processed in accordance with the second schema. In some embodiments, the database migrator may convert, responsive to determining that the metadata is to be processed, an output of the write operation from the first schema to the second schema based on the metadata for storing the second data object corresponding to the output onto the second database.

In some embodiments, the database migrator may determine that processing of all write operations maintained on a queue corresponding to a plurality of second data objects stored onto the second database in accordance with the second schema is complete. In some embodiments, the database migrator may delete the first database, responsive to the determination that the processing of all write operations maintained on the queue is complete. In some embodiments, the database migrator may identify, subsequent to converting the first data object from first schema to the second schema during a predefined time window prior to migrating the client from the first database to the second database, a third data object received by the first database. In some embodiments, the database migrator may store the third data object onto the second database in accordance with the second schema.

In some embodiments, the database migrator may instantiate a new virtual machine for the client to access and write to the second database, responsive to migrating the client from the first database to the second database. In some embodiments, the database migrator may reverse, responsive to a request to roll back, conversion of the first data object from the first schema to the second schema to maintain the first data object in accordance with the first schema.

Another aspect of this disclosure is directed to a system for migrating clients between databases with different schemas. The system may include a database migrator executable on one or more processors. The database migrator may identify a first database accessible by the client. The first database may include a first data object maintained in accordance with a first schema. The database migrator may generate, using the first database, a second database including the first data object from the first database maintained in accordance with the first schema. The database migrator may store, onto the second database in accordance with a second schema, a second data object received by the first database subsequent to generation of the second database. The database migrator may convert the first data object of the second database from the first schema to the second schema. The database migrator may migrate the client from the first database to the second database responsive to completing storing of the second data object onto the second database in accordance with the second schema and completing converting of the first data object of the second database from the first schema to the second schema.

In some embodiments, the database migrator may maintain a queue for a write operation corresponding to the second data object to be stored onto the first database and the second database. In some embodiments, the database migrator may store, concurrent to converting the first data object from the first schema to the second schema, an output of the write operation corresponding to the second data object onto the first database. In some embodiments, the database migrator may add, responsive to storing the output of the write operation onto the first database, metadata associated with the write operation onto the queue for converting the second data object in accordance with the second schema. The metadata may specify a location of the second data object received by the first database.

In some embodiments, the database migrator may maintain the queue including a buffer for a plurality of write operations. In some embodiments, the database migrator may insert each write operation of the plurality of write operations and metadata corresponding to the write operation into the buffer subsequent to processing of the write operation. In some embodiments, the database migrator may identify, from a queue including a write operation corresponding to the second data object stored onto the first database. The write operation may be subsequent to a backup time at which the second database is generated. In some embodiments, the database migrator may process the write operation of the queue subsequent to the backup time to store the second data object onto the second database in accordance with the second schema.

In some embodiments, the database migrator may maintain a queue including a plurality of queries. The plurality of queries may include a write operation corresponding to the second data object. In some embodiments, the database migrator may determine that the write operation corresponding to the second data object involves changing a schema of the second data object to the second schema. In some embodiments, the database migrator may store the second data object corresponding to the write operation in accordance with the second schema, responsive to determining that the write operation involves changing a schema of the second data object to the second schema.

In some embodiments, the database migrator may identify, from a queue for maintaining a write operation corresponding to the second data object, metadata associated with the write operation specifying a location of the second data object received by the first database. In some embodiments, the database migrator may determine that the metadata associated with the write operation is to be processed in accordance with the second schema. In some embodiments, the database migrator may convert, responsive to determining that the metadata is to be processed, an output of the write operation from the first schema to the second schema based on the metadata for storing the second data object corresponding to the output onto the second database.

In some embodiments, the database migrator may determine that processing of all write operations maintained on a queue corresponding to a plurality of second data objects stored onto the second database in accordance with the second schema is complete. In some embodiments, the database migrator may delete the first database, responsive to the determination that the processing of all write operations maintained on the queue is complete. In some embodiments, the database migrator may identify, subsequent to converting the first data object from first schema to the second schema during a predefined time window prior to migrating the client from the first database to the second database, a third data object received by the first database. In some embodiments, the database migrator may store the third data object onto the second database in accordance with the second schema.

In some embodiments, the database migrator may instantiate a new virtual machine for the client to access and write to the second database, responsive to migrating the client from the first database to the second database. In some embodiments, the database migrator may reverse, responsive to a request to roll back, conversion of the first data object from the first schema to the second schema to maintain the first data object in accordance with the first schema.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
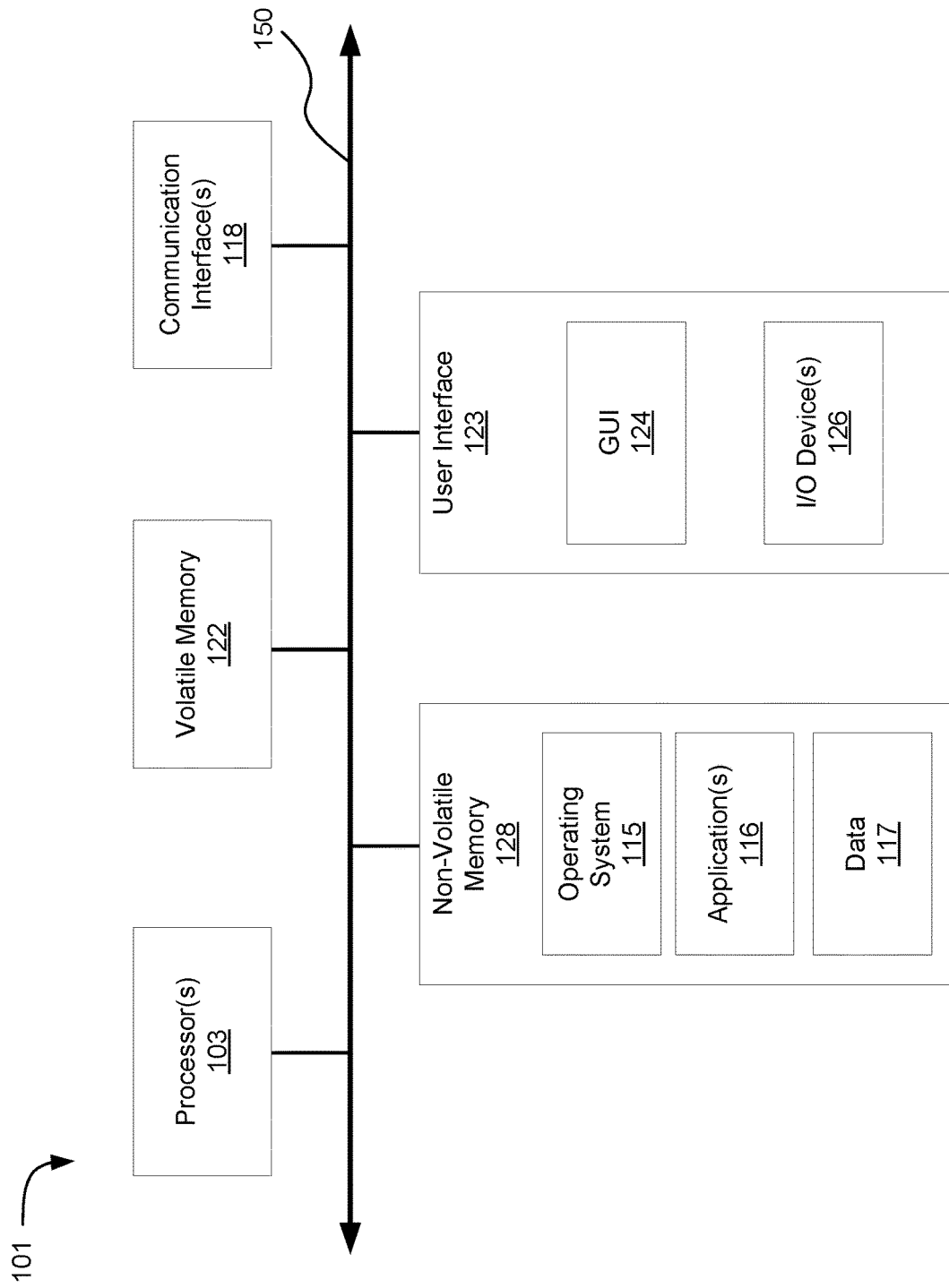
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for migrating clients between databases with different schemas.

A. Computing Environment

Prior to discussing the specifics of embodiments of the systems and methods of migrating clients between databases with different schemas, it may be helpful to discuss the computing environments in which such embodiments may be deployed.

As shown in FIG. 1, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1 is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, the computing device 101 may execute an application on behalf of a user of a client computing device, may execute a virtual machine, which provides an execution session within which applications execute on behalf of a user or a client computing device, such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Migrating Clients Between Databases with Different Schemas

The present disclosure is directed towards systems and methods for migrating clients between databases with different schemas. A database may include a collection of data objects arranged in accordance with a schema. The schema may define a syntax specification for classifying well-formed data objects. In addition, the schema may specify a structural relationship of the data objects to one another within the database. Each data object may be queried or written onto the database in adherence to the schema. Upon request from a client, the schema of the database may be updated or otherwise modified, resulting in a change in the syntax specification or the structural relationship.

Under existing solutions, the migration of a database from one schema to another schema may rely on a transaction log for the database. The transaction log may represent a snapshot of all the contents of the current database, and may record every write or modification operation on every data object of the database up to a predefined point-in-time (e.g., when the database is copied for backup). By applying all the write and modification operations of the transaction log, a new database mirroring the previous database may be constructed, with the existing data objects updated with the new schema. This technique, however, may not allow for application of live schema changes. That is, any new write or modification operations made subsequent to the predefined point-in-time for the transaction log may be absent from the new database. Furthermore, as the migration of the database from one schema to the new schema may utilize an extended period of time, users of the database may be locked out from making further modifications during this time period.

To eliminate the lockout period stemming from existing solutions dependent on transaction logs, the present systems and methods provide for just-in-time, zero-downtime migration of databases from one schema to another. A database management system may identify an existing database (also referred to as the "source database") maintained in accordance with a prior schema. A copy of the source database may be restored to create a new database (also referred to as the "target database"). The database management system may apply changes in the schema to the data objects of the new database. In the meanwhile, the database management system may instantiate and maintain a queue to keep track of any new write or modification operations received by the existing database. The queue may be also used to track metadata of the intervening write and modification operations (e.g., location of the corresponding data object in the database). As the new schema is applied to the data objects of the new database, the database management system may process the new write or modification operations stored in the circular buffer from the time of the creation of the new database. For each operation, the database management system may determine whether the new schema is to be applied. If the operation results in a change under the new schema, the output of the operation and any associated metadata may be transformed in adherence to the new schema and loaded onto the new database. Otherwise, the output of the operation and any associated metadata may be written onto the new database without any changes. Once all the operations of the queue are processed, the database management system may migrate the client from the source database to the target database.

In this manner, the database may be migrated from one schema to another schema, seamlessly and without any disruptions in service to the users during the update, thereby improving service-level agreement (SLA) performance. Furthermore, new write and modification operations may be processed as the migration from one schema to another is occurring.

Figure 2A:
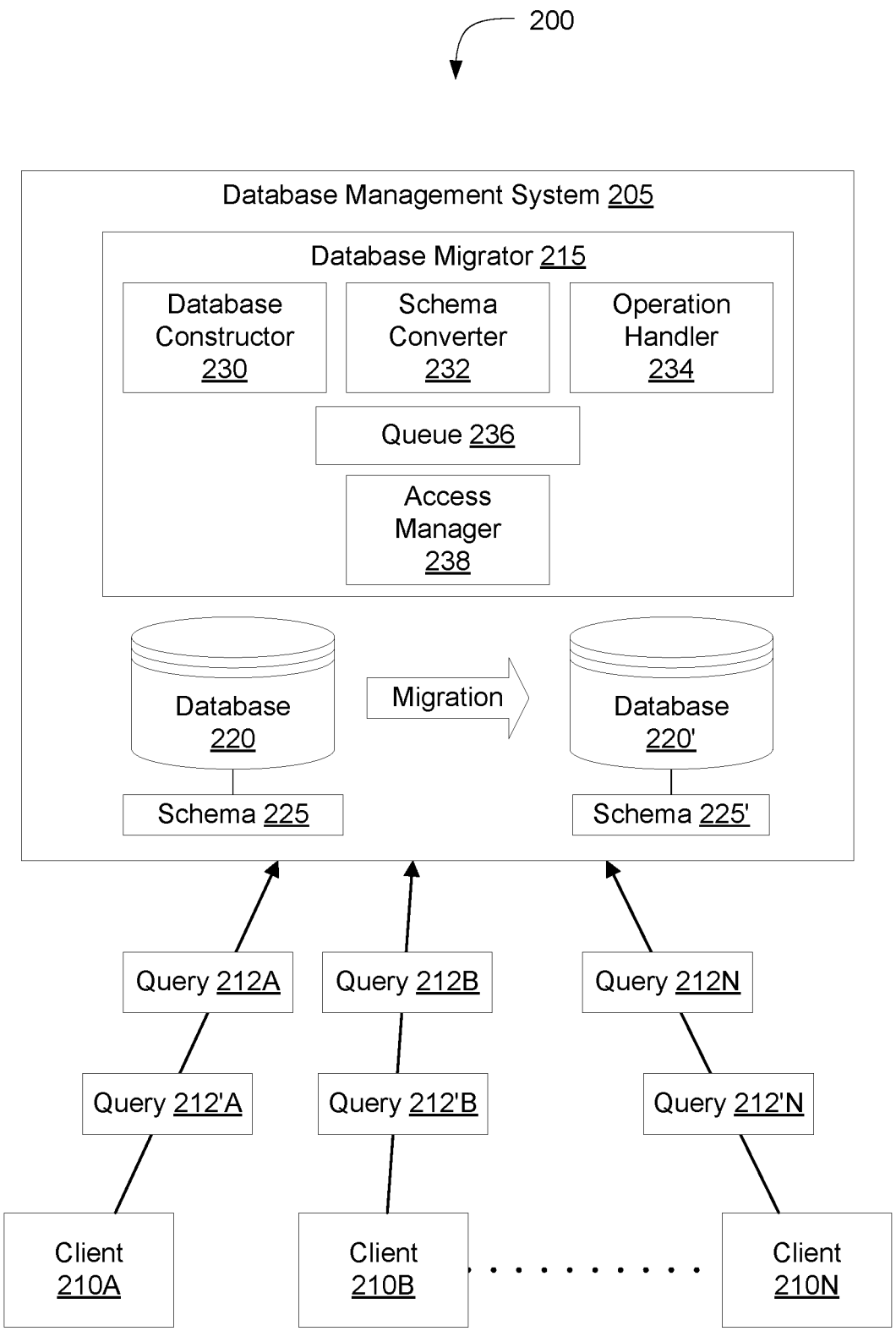
FIG. 2A is a block diagram of an embodiment of a system for migrating clients between databases with different schemas.

Referring now to FIG. 2A, depicted is a block diagram of an embodiment of a system 200 for migrating clients between databases with different schemas. In overview, the system 200 may include a database management system 205 and one or more clients 210A-N. The database management system 205 may include a database migrator 215 and one or more databases 220 and 220'. The database migrator 215 may include a database constructor 230, a schema converter 232, an operation handler 234, a queue 236, and an access manager 238, among others. The database 220 (also referred to as a "source database") may be maintained in accordance with a schema 225, and may be used to generate the database 220' (also referred to as a "target database") in accordance with a schema 225' in the manner detailed below. Each client 210A-N (hereinafter generally referred to as client 210) may correspond to a virtual machine instance operating on behalf of one or more end users in communication with the database management system 205.

Each of the above-mentioned elements or entities is implemented in hardware, or a combination of hardware and software, in one or more embodiments. Each component of the system 200 may be implemented using hardware or a combination of hardware or software detailed above in connection with FIG. 1. For instance, each of these elements or entities can include any application, program, library, script, task, service, process or any type and form of executable instructions executing on hardware of the database management system 205, such as the database migrator 215 and databases 220 and 220', and the clients 210. The hardware includes circuitry such as one or more processors in one or more embodiments.

As context, the database management system 205 may initially maintain the database 220 in accordance to the schema 225. The database 220 may store, track, or otherwise include one or more data objects arranged in accordance to the schema 225. The database 220 may be accessible to one or more end users corresponding to the one or more clients 210. In some embodiments, the database 220 may be accessible to one or more virtual machine instances associated with one or more clients 210. In some embodiments, the database 220 may be implemented using Structure Query Language (SQL) (e.g., Microsoft SQL Server™ or MySQL™), Oracle Database™, IBM db2™, IBM Informix™, Teradata™, SAP Sybase Adaptive Server Enterprise™, and SAP Sybase IQ™, among others. The one or more data objects of the database 220 may include tables, columns, fields, views, indexes, sequences, views, synonyms, and stored procedures, among others. The schema 225 may define a syntax specification (also referred to as integrity constraints) for determining well-formed data objects in the database 220. In addition, the schema 225 may specify a structural relationship of the data objects to another in the database 220. In some embodiments, the structural relationship specified by the schema 225 may include a logical grouping of the one or more data objects stored in the database 220. In some embodiments, the schema 225 may indicate one or more owners and owner permissions. The owner permissions may specify whether the one or more owners corresponding to end users may query, create, manipulate, and/or delete data objects in the database 220.

To store additional data onto the database 220 or modify existing data, an end user or client corresponding to a client 210 may send a query 212A-N (hereinafter generally referred to as query 212). The end user or instance corresponding to the client 210 may have access to the database 220 (e.g., read and/or write). The query 212 may correspond to or include a write operation to add or modify one or more data objects of the database 220, among other functions related to the database 220. The query 212 may specify whether data are to be newly written (e.g., using SQL INSERT INTO or CREATE statements) or existing data are to be modified (e.g., using SQL DELETE, DROP, ALTER, UPDATE statements). In some embodiments, the data may be stored in the body of the query 212 and the metadata may be stored in the header of the query 212. The metadata may specify one or more attributes of the data. The database migrator 215 may maintain the queue 236 to keep track of the queries 212 as the queries 212 are received. In some embodiments, the queue 236 may be implemented using Microsoft™ Azure™ queue. The queue 236 may include the queries 212 arranged in sequence of arrival at the database migrator 215. In some embodiments, the database migrator 215 may identify a receipt time and may store the receipt time with the query 212 onto the queue 236. The database migrator 215 may identify the earliest received query 212 from the queue 236. Each time new added is added or existing data is modified, the database management system 205 may process the identify query 212 to determine whether the data in the query 212 conform to the schema 225 specified for the database 220. If the data are determined to conform to the schema 225, the database management system 205 may perform the query 212 by writing a new data object onto the database 220 or modifying an existing data object on the database 220.

If the query 212 specifies addition of new data to the database 220, the query 212 may include new data to be stored as a data object onto the database 220 and metadata associated with the data object. The database management system 205 may parse the query 212 to identify the new data. The database management system 205 may then instantiate a new data object with the new data in accordance with the schema 225 to store onto the database 220. The database management system 205 may also generate or identify metadata for the new data object in accordance with the schema 225. The metadata may include one or more attributes of the new data object (e.g., location, constraints, references to other data objects, etc.). In some embodiments, the query 212 may include data to be modified on the database 220 and metadata associated with the data object. The query 212 may include an identifier for the data object of the database 220 to be modified. On the other hand, if the query 212 specifies existing data is to be modified, the database management system 205 may parse the query 212. From the query 212, the database management system 205 may identify the data object corresponding to the identifier. The database management system 205 may modify the data of the data object as specified by the query 212. The database management system 205 may also generate or identify the metadata for the new data object in accordance with the schema 225. The metadata may include one or more attributes of the new data object (e.g., location, constraints, references to other data objects, etc.).

When schema 225 of the database 220 is to be updated with the new schema 225', the database constructor 230 of the database migrator 215 may identify the database 220 to be converted. In some embodiments, the database constructor 230 may receive a request to update schema from an administrator or a user (e.g., via one of the clients 210) of the database management system 205. The request may specify the database 220 to be updated with the new schema 225'. In some embodiments, the request may include a database identifier corresponding to the database 220. The request may also include the new schema 225' (e.g., using SQL CREATE SCHEMA, DROP SCHEMA, or ALTER SCHEMA statements). In some embodiments, the request may specify modifications to the current schema 225. Using the request, the database constructor 230 may identify the database 220 to be updated from the schema 225 to the new schema 225'. In some embodiments, the database constructor 230 may identify the database 220 corresponding to the database identifier of the request.

Having identified the database 220 to be identified with the new schema 225', the database constructor 230 may generate a new database 220' using the one or more data objects of the database 220. In some embodiments, the database constructor 230 may identify a backup time corresponding to the generation of the new database 220'. In some embodiments, the database constructor 230 may copy the database 220 to generate the new database 220'. In generating the database 220', the database constructor 230 may identify the data objects of the database 220. In some embodiments, the database constructor 230 may identify each data object included in the database 220. Using the data objects identified from the database 220, the database constructor 230 may generate the database 220'. Once generated, the database 220' may include the one or more data objects of the database 220 at the point in time that the database 220' was generated using the database 220. The data objects of the database 220' may also be originally be in conformance with the previous schema 225.

To switch the database 220' over from the previous schema 225, the schema converter 232 may identify the new schema 225' to which to apply to the data objects of the database 220'. In some embodiments, the schema converter 232 may identify the new schema 225' from the request to update the schema. In some embodiments, the schema converter 232 may identify the modifications to the previous schema 225 from the request to update the schema. The modifications may include changes to the syntax specification, the structural relationship, the one or more owners, or the owner permissions, among others. For example, the modifications may specify a change in a number of columns in a table or owner permissions for a particular user. Using the modifications to the previous schema 225, the schema converter 232 may to generate or determine the new schema 225'.

Using the new schema 225', the schema converter 232 may convert the data objects of the database 220' from the previous schema 225 to the new schema 225'. In some embodiments, the schema converter 232 may traverse the one or more data objects of the database 220'. At this point, the one or more objects of the database 220' may still be in conformance with the previous schema 225 and not the new schema 225'. For each data object of the database 220', the schema converter 232 may apply the new schema 225' to the data object. In some embodiments, the schema converter 232 may determine whether the new schema 225' will affect the data object of the database 220'. In some embodiments, the schema converter 232 may determine whether the new schema 225' specifies an alteration corresponding to the data object in determining whether the new schema 225' alter the data object. The new schema 225' may result in a change for a subset of the data objects of the database 220'. For example, the new schema 225' may affect tables but not stored procedures.

If the new schema 225' is determined to affect the data object, the schema converter 232 may apply the new schema 225' to the data object (e.g., using SQL ALTER TABLE statement). In some embodiments, in applying the change to the database object, the schema converter 232 may determine whether other objects in the database 220' are affected as a result of the change in schema of the data object. The schema converter 232 may identify the one or more other data objects affected by the change in schema of one data object in the database 220'. For example, a change in the number of fields in a table data object may affect columns that reference other fields in the table. For each identified data object, the schema converter 232 may modify the data object to conform to the new schema 225'. Otherwise, if the new schema 225' is determined not to affect the data object, the schema converter 232 may maintain the data object with the previous schema 225, thereby saving computing processing resources.

As the data objects of the database 220' are converted from the previous schema 225 to the new schema 225', the database management system 205 may receive one or more additional queries 212'A-N (hereinafter generally referred to as query 212') for the database 220 from the clients 210. The query 212' may be similar to query 212, save for receipt by the database management system 205 subsequent to the generation of the database 220'. In some embodiments, the one or more queries 212 may be from one or more instances corresponding to the clients 210. In some embodiments, the original database 220 may receive the one or more queries 212' from the clients 210, subsequent to the generation of the database 220'. Each query 212' may be a write operation to add additional data objects onto the original database 220 or to modify data objects on the original database 220. The query 212' may include data to be modified on the database 220 and metadata associated with the data object. In some embodiments, subsequent to the generation of the database 220', the original database 220 or the database management system 205 may receive one or more new data objects corresponding to the respective query 212'.

The operation handler 234 may identify, intercept or otherwise receive the one or more query 212' from the clients 210, while the data objects of the database 220' are converted. The operation handler 234 may maintain the queue 236 to keep track of the one of more query 212' received by the database 220 from the client 210. The queue 236 may include the one or more query 212' arranged in sequence of receipt at the database 220. Each the query 212' is received, the operation handler 234 may identify a receipt time and may store the receipt time with the query 212' onto the queue 236. In some embodiments, the operation handler 234 may maintain the queue 236 to keep track of the one or more write operations corresponding to the query 212' received by the database 220 from the client 210. As with query 212, each write operation corresponding to the query 212' may be to add or modify data objects of the database 220. The queue 236 may include the one or more write operations corresponding to the query 212 arranged in sequence of receipt at the database 220. Each the query 212' is received, the operation handler 234 may identify a receipt time and may store the receipt time with the query 212' or the corresponding write operation onto the queue 236. In some embodiments, the queue 236 may include a buffer to keep track of the query 212' or the write operations corresponding to the query 212'. The buffer may be a circular buffer (sometimes referred to as a circular queue, a cyclic buffer, or a ring buffer) that may include the one or more query 212' or the one or more write operations corresponding to the respective query 212'. The front of the buffer of the queue 236 may be the earliest received. The back of the buffer of the queue 236 may be latest received query 212' or the most recently processed query 212'.

Having received the query 212' as the database 220' is being converted from the previous schema 225 to the new schema 225', the operation handler 234 may process each write operation corresponding to the respective query 212'. The operation handler 234 may identify the query 212' from the queue 236. In some embodiments, the operation handler 234 may identify the earliest received query 212' from the queue 236. In some embodiments, the operation handler 234 may identify the receipt time of the identified query 212'. The operation handler 234 may compare the receipt time of the identified query 212' to the backup time corresponding to the generation of the database 220'. If the receipt time of the query 212' is determined to be prior to the backup time, the operation handler 234 may remove the query 212' from the queue, as the data object corresponding to the query 212' is already in the database 220'. Conversely, if the receipt time of the query 212' is determined to be subsequent to the backup time, the operation handler 234 may proceed to process the query 212'.

In processing the query 212', the operation handler 234 may generate an output of the write operation corresponding to the query 212' and may store a data object corresponding to the output of the write operation onto the previous database 220 and the database 220'. For storing the data object onto the database 220, the operation handler 234 may generate the data object from the write operation of the query 212' in accordance with the schema 225. The operation handler 234 may parse the query 212' to identify the new data included therein. The operation handler 234 may then instantiate a new data object with the new data in accordance with the schema 225 to store onto the database 220. The operation handler 234 may also generate or identify metadata for the new data object from the query 212' in accordance with the schema 225. The metadata may include one or more attributes of the new data object (e.g., location, constraints, references to other data objects, etc.). On the other hand, if the query 212' specifies existing data is to be modified, the operation handler 234 may parse the query 212. From the query 212', the operation handler 234 may identify the data object corresponding to the identifier. The operation handler 234 may modify the data of the data object as specified by the query 212' in accordance with the original schema 225. The operation handler 234 may also generate or identify metadata for the new data object from the query 212' in accordance with the schema 225. The metadata may include one or more attributes of the new data object (e.g., location, constraints, references to other data objects, etc.).

Once the data object corresponding to the query 212' is stored onto the database 220, the operation handler 234 may identify the next query 212' from the queue 236 and repeat the functionality for the next query 212'. The operation handler 234 may also insert or add the metadata associated with the previously processed query 212' into the queue 236 for converting the new data object to the new schema 225'. In some embodiments, the operation handler 234 may further insert an indicator that the output corresponding to the write operation of the associated query 212' is stored onto the database 220. In some embodiments, the operation handler 234 may remove the query 212' from the front of the buffer of the queue 236. Upon processing of the query 212', the operation handler 234 may insert or add the query 212' to the back of the buffer of the queue 236. In some embodiments, the operation handler 234 may insert or add the associated metadata together with the query 212' onto the back of the buffer. In this manner, the buffer of the queue 236 may be used to store new data objects corresponding to the one or more queries 212' onto the new database 220' in the same sequence as the outputs of the corresponding write operations were stored onto the database 220.

For storing the data object onto the database 220', the operation handler 234 may identify one or more queries 212' processed to store respective data objects onto the database 220 from the queue 236. The operation handler 234 may process the one or more queries 212' received subsequent to the generation of the database 220' in the sequence of receipt or in the sequence of processing. In some embodiments, the operation handler 234 may identify the most recently processed query 212', the write operation, or the output of the write operation from the queue 236 used to generate and store the new data object onto the database 220. In some embodiments, the operation handler 234 may identify the metadata associated with the most recently processed query 212', the write operation, or the output of the write operation from the queue 236. In some embodiments, the operation handler 234 may identify the query 212', the write operation, and the output of the write operation at the back of the buffer of the queue 236. In some embodiments, the operation handler 234 may identify the metadata associated with the most recently processed query 212', the write operation, or the output of the write operation at the back of the buffer of the queue 236.

Once the most recently processed query 212' is identified, the operation handler 234 may generate the new data object from the write operation of the query 212' in accordance with the new schema 225'. In some embodiments, the operation handler 234 may determine whether the write operation corresponding to the query 212' involves changing a schema of the new data object to the new schema 225'. In some embodiments, the operation handler 234 may determine whether the write operation corresponding to the query 212' involves changing the schema. In some embodiments, the operation handler 234 may determine whether the metadata associated with the query 212' is to be processed in accordance with the new schema 225'. The metadata may be indicative whether changing of the schema is involved based on the specified attributes of the associated data object, such as location, constraints, or references to other data objects. For example, the metadata may specify a different or position for a table data object different from the specifications of the new schema 225'.

If the write operation corresponding to the query 212' is determined to involve a change in schema, the operation handler 234 may apply the new schema 225' to the data object corresponding to the output of the write operation. In some embodiments, the operation handler 234 may convert the output of the write operation from the previous schema 225 to the new schema 225' based on the metadata associated with the query 212'. In some embodiments, the operation handler 234 may determine one or more attribute differences between the previous schema 225 and the new schema 225' based on the metadata. Using the one or more attribute differences, the operation handler 234 may identify one or more modifications to the new data object corresponding to the output of the write operation. The modifications may include alterations in position, constraints, and references to other data objects, among others. Once identified, the operation handler 234 may apply the one or more modifications to the new data object. On the other hand, if the write operation corresponding to the query 212' is determined to not involve a change in schema, the operation handler 234 may store the new data object corresponding to the output of the write operation onto the new database 220' without application of the new schema 225'.

As each query 212' is processed and the output of the corresponding write operation stored on the database 220' in accordance with the schema 225', the operation handler 234 may determine whether processing of all write operations maintained in the queue 236 is complete. In some embodiments, the operation handler 234 may traverse the queue 236 to determine whether the output corresponding to the write operation of each query 212' is stored onto the database 220' based on the stored indicator. As previously discussed, the indicator may signify that the output of the corresponding write operation is stored as a new data object onto the database 220' in accordance with the new schema 225'. If all the queries 212' are determined to have been processed, the operation handler 234 may determine that the processing of all write operations maintained in the queue 236 is complete. Further, the migration of the clients 210 from the old database 220 to the new database 220' may proceed. On the other hand, if at least one query 212' is determined to not yet have been processed, the operation handler 234 may determine that the processing of all the write operations maintained in the queue 236 is not yet complete. In addition, the operation handler 234 may proceed to process the queries 212' remaining in the queue 236.

During a predefined time period between migration the clients 210 from the old database 220 to the new database 220' and completion of the processing of the queries 212', additional queries 212' may be received from the clients 210 and accepted for processing. The operation handler 234 may process the query 212' received during the predefined time period in a similar manner as with the previously received queries 212'. In summary with each query 212' received during the predefined time period, the operation handler 234 may generate the new data object from the write operation of the query 212' in accordance with the old schema 225 to store onto the database 220. The operation handler 234 may generate or identify metadata for the new data object from the query 212' in accordance with the schema 225. The operation handler 234 may also insert or add the metadata associated with the query 212' into the queue 236. The operation handler 234 may then identify the most recently processed query 212', the write operation, or the output of the write operation from the queue 236 used to generate and store the new data object onto the database 220. The operation handler 234 may determine whether the write operation corresponding to the query 212' involves changing a schema of the new data object to the new schema 225' based on the associated metadata. If the write operation corresponding to the query 212' is determined to involve a change in schema, the operation handler 234 may apply the new schema 225' to the data object corresponding to the output of the write operation. Otherwise, if the write operation corresponding to the query 212' is determined to not involve a change in schema, the operation handler 234 may store the new data object corresponding to the output of the write operation onto the new database 220' without application of the new schema 225'.

At any point during the conversion of the database 220' from the previous schema 225 to the new schema 225', the database migrator 215 may receive a request to roll back from an end user or an administrator (e.g., client 210). The request to roll back may specify the database 220 to be restored with the original schema 225. In some embodiments, the request may include a database identifier corresponding to the database 220. The request may also include the original scheme 225 (e.g., using SQL CREATE SCHEMA, DROP SCHEMA, or ALTER SCHEMA statements). Upon receipt of the request to roll back, the schema converter 232 may terminate conversion of the data objects of the database 220' from the original schema to the new schema 225'. In addition, the schema converter 232 may delete or terminate the new database 220'. As the original database 220 still remains, the database migrator 215 may cease or end the conversion of the database 220' without any impact to the original database 220. Further, since the new data is written onto the original database 220 using the subsequently received queries 212', additional queries 212' received between the request to update schema and the request to rollback may be processed without any interruption. In this manner, reversing the conversion of database schemas may be performed seamlessly without locking out or any other adverse impact to the clients 210.

After completion of the conversion of the data objects of the database 220' to the new schema 225' and storing of new data objects based on the queries 212', the access manager 238 may migrate or switch over the clients 210 from the original database 220 to the new database 220'. In some embodiments, the access manager 238 may delete or remove the original database 220 once the conversion and storage are completed. In some embodiments, the access manager 238 may move the reference of the client 210 from the original database 220 to the new database 220' in response to completion of the conversion and the storage. In some embodiments, the access manager 238 may instantiate or create a new virtual machine instance for the client 210 to access the new database 220'. For example, a multi-tenanted XenDesktop (XD) service virtual machine may be instantiated or created for the client 210 to access the new database 220'.

Figure 2B:
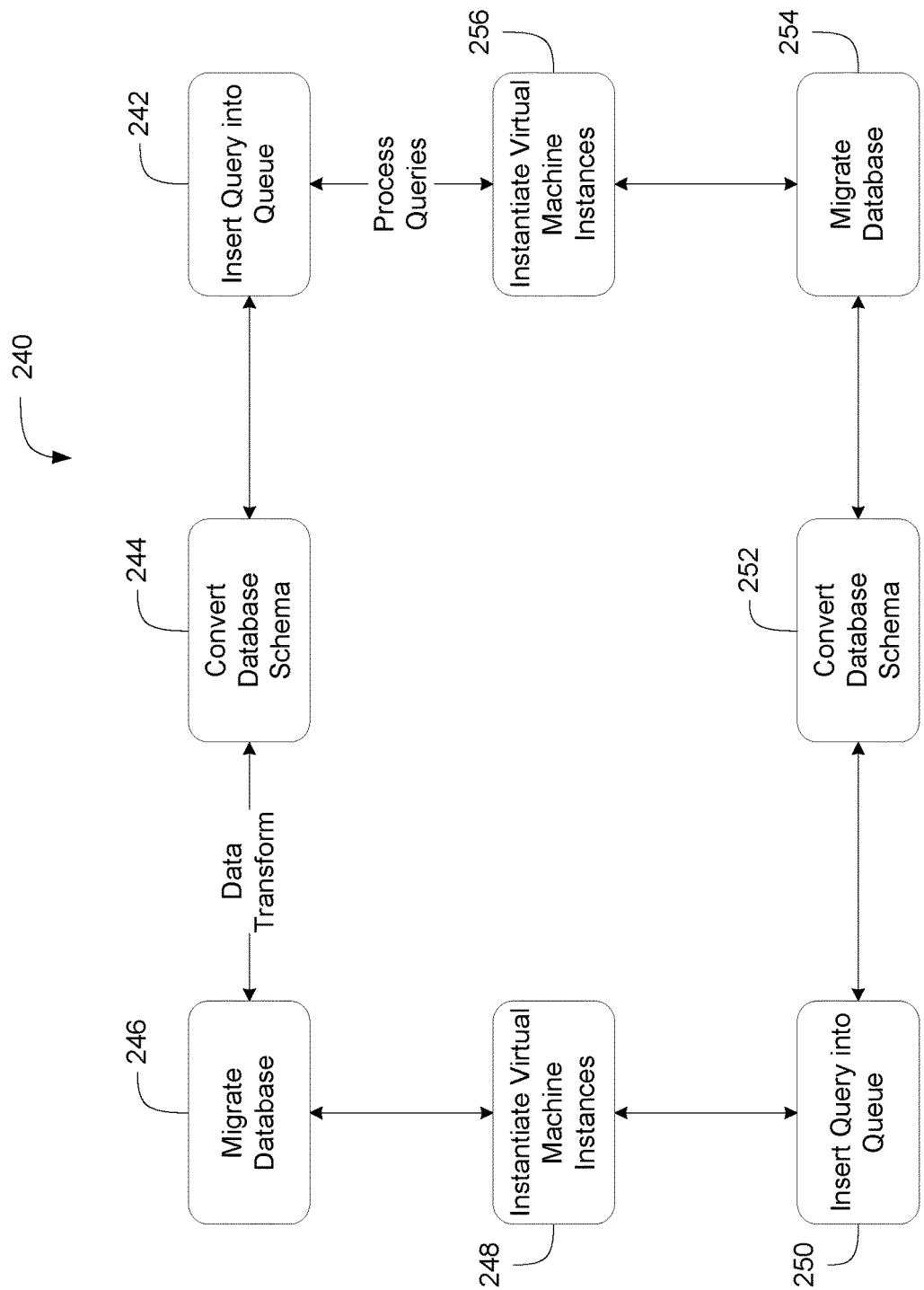
FIG. 2B is a sequence diagram of an embodiment of a system of migrating clients between databases with different schemas.

Referring now to FIG. 2B, depicted is a sequence diagram of an embodiment of the system 200 for migrating clients between databases with different schemas. The circular sequence 240 depicted may be implemented using system 100 or 200 detailed above. Under circular sequence 240, the database migrator may insert a query into a queue (242). The query may correspond to a write operation for an original database and a new database. The original database may be maintained in accordance with one schema. The new database may be maintained in accordance with a new schema. The database migrator may convert the database schema (244). The data objects of the new database may initially be conformance with the original schema of the original database. The database migrator may transform data objects of the new database from the original schema to the new schema. While converting, the database migrator may process the queries of the queue. The database migrator may store new data objects corresponding to the output of the query onto the original database in accordance with the original schema. The database migrator may also store the new data object onto the new database in accordance with the new schema. The database migrator may migrate the clients from the previous database to the new database (246). The migration may be performance, upon completion of the conversion of the data objects from the original database and storage of new data objects received in the interim. The database migrator may instantiate virtual machine instances (248). Each virtual machine instance may be used by one or more clients to access the new database with the new schema.

The circular sequence 240 may repeat again. The database migrator may insert another query into the queue (250). The query may correspond to a write operation for an original database and a new database. The original database may be maintained in accordance with one schema. The new database may be maintained in accordance with a new schema. The database migrator may convert the database schema (252). The data objects of the new database may initially be conformance with the original schema of the original database. The database migrator may transform data objects of the new database from the original schema to the new schema. While converting, the database migrator may process the queries of the queue. The database migrator may store new data objects corresponding to the output of the query onto the original database in accordance with the original schema. The database migrator may also store the new data object onto the new database in accordance with the new schema. The database migrator may migrate the clients from the previous database to the new database (254). The migration may be performance, upon completion of the conversion of the data objects from the original database and storage of new data objects received in the interim. The database migrator may instantiate a virtual machine instance for each client (256). Each virtual machine instance may be used by one or more clients to access the new database with the new schema. In some embodiments, the sequence 240 may be reversed to allow for rolling back of the conversion of the database from the requested schema back to the previous schema.

Figure 2C:
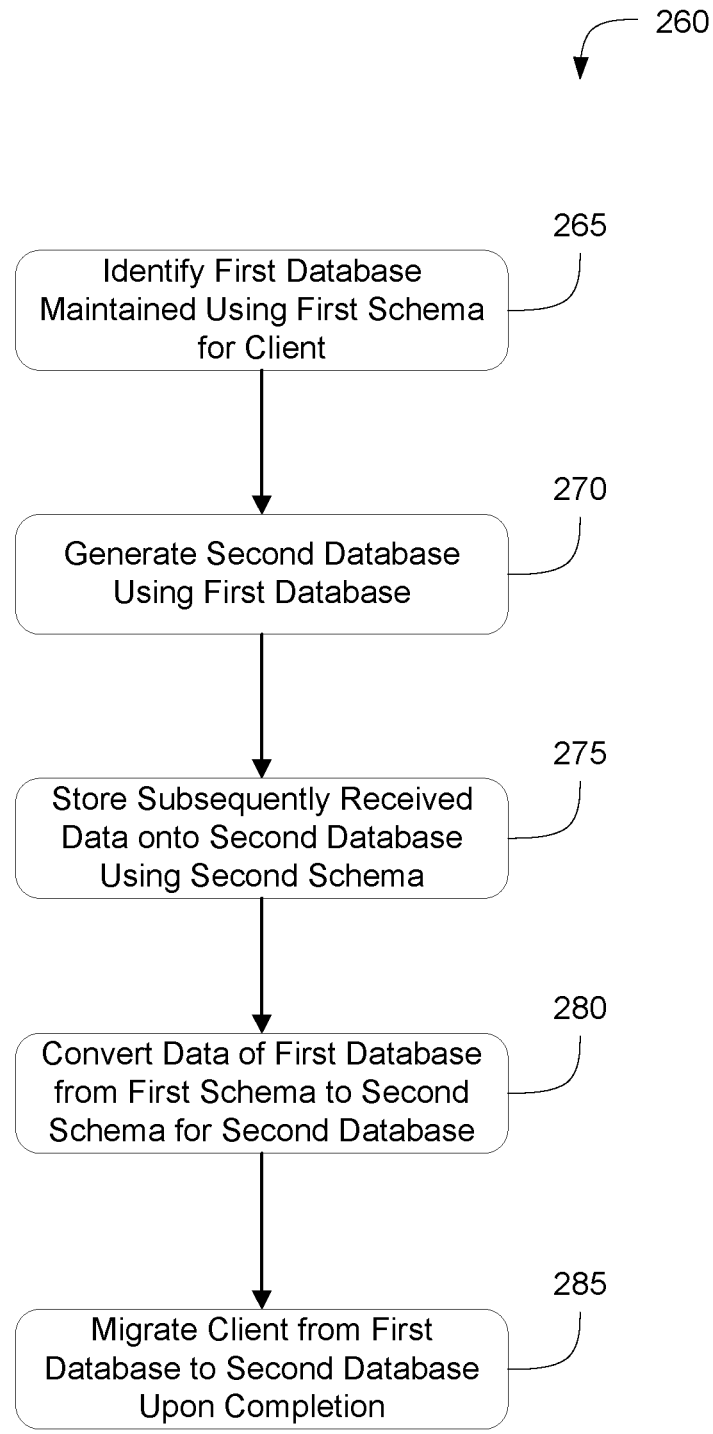
FIG. 2C is a flow diagram of an embodiment for a method of migrating clients between databases with different schemas.

Referring now to FIG. 2C, depicted is a flow diagram of an embodiment of a method 260 of migrating clients between databases with different schemas. The operations and functionalities of the method 400 may be performed by the components described in FIG. 1 and FIG. 2A, the system 100, and/or the system 200 detailed above. In brief overview, a database migrator may identify a first database maintained using a first schema for a client (265). The database migrator may generate a second database using the first database (270). The database migrator may store subsequent received data onto second database using the second schema (275). The database migrator may convert data of the first database from the first schema to the second schema for the second database (280). The database migrator may migrate the client from the first database to the second database (285).

In further detail, a database migrator may identify a first database maintained using a first schema for a client (265). The first database may include one or more data objects maintained using the first schema. The first schema may specify a syntax specification for classifying well-formed data objects and a structural relationship among the data objects to one another. The database migrator may receive a request to update schema from the client. The request to update schema may specify the first database and may include a second schema. The second schema may specify a syntax specification and a structural relationship different from the first schema.

The database migrator may generate a second database using the first database (270). Upon receipt of the request to update, the database migrator may identify the first database specified in the request. The database migrator may copy the one or more data objects of the first database to generate the second database. The second database may initially include the one or more data objects maintained in the first schema.

The database migrator may store subsequent received data onto second database using the second schema (275). After the copying of the first database to generate the second database, the database migrator may receive a query. The query may correspond to a write operation to add or modify data in the first database. The database migrator may maintain multiple queries received after the copying of the first database in a queue. The queue may arranged the queries in sequence of receipt. The database migrator may process the queries of the queue. For each query, the database migrator may generate a new data object and may store the data object onto the first database in accordance with the first schema. The database migrator may also convert the new data object from the first schema to the second schema, and may store the data object onto the second database.

The database migrator may convert data of the first database from the first schema to the second schema for the second database (280). Concurrent to receiving data subsequent to the generation of the second database, the database migrator may traverse the data objects of the second database. For each data object, the database migrator may determine whether the second schema affects the data object. If the second schema is determined to affect the data object, the database migrator may apply the second schema onto the data object. The database migrator may also identify other data objects affect by the application of the second schema. The database migrator may apply the second schema on the identified data objects to conform the second database to the second schema. Conversely, if the second schema is determined to not affect the data object, the database migrator may maintain the data object on the second database.

The database migrator may migrate the client from the first database to the second database (285). Upon completion of storage (275) and conversion (280), the database migrator may switch over the clients from the first database to the second database. The database migrator may also instantiate or create a new virtual machine for each client to access the second database. In addition, the database migrator may delete the first database.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of migrating clients between databases with different schemas, comprising:

identifying, by a database migrator executing on one or more processors, for a plurality of clients, a first database accessible by the plurality of clients, the first database including a first data object maintained in accordance with a first schema;

generating, by the database migrator, a second database for storing the first data object onto the second database in a second schema;

receiving, by the database migrator prior to converting the first data object from the first schema to the second schema, a write operation from a client of the plurality of clients to store a second data object onto the first database;

determining, by the database migrator, that the write operation to the first database is received subsequent to generation of the second database to which the plurality of clients are to be migrated;

storing, by the database migrator, onto the second database in accordance with the second schema instead of onto the first database in accordance with the first schema, the second data object responsive to determining that the write operation is received subsequent to the generation of the second database;

converting, by the database migrator, subsequent to storing the second data object to the second database, the first data object from the first schema to the second schema; and migrating, by the database migrator, the plurality of clients from the first database to the second database responsive to storing the second data object onto the second database in accordance with the second schema and converting the first data object from the first schema to the second schema.

2. The method of claim 1, further comprising:

maintaining, by the database migrator, a queue for the write operation corresponding to the second data object to be stored onto the first database and the second database;

storing, by the database migrator, concurrent to converting the first data object from the first schema to the second schema, an output of the write operation corresponding to the second data object onto the first database; and adding, by the database migrator responsive to storing the output of the write operation onto the first database, metadata associated with the write operation onto the queue for converting the second data object in accordance with the second schema, the metadata specifying a location of the second data object received by the first database.

3. The method of claim 2, wherein maintaining the queue further comprises maintaining the queue including a buffer for a plurality of write operations; and further comprising:
inserting, by the database migrator, each write operation of the plurality of write operations and metadata corresponding to the write operation into the buffer subsequent to processing of the write operation.

4. The method of claim 1, further comprising:
identifying, by the database migrator, from a queue including the write operation corresponding to the second data object stored onto the first database, the write operation subsequent to a backup time at which the second database is generated; and
wherein storing the second data object onto the second database further comprises processing the write operation of the queue subsequent to the backup time to store the second data object onto the second database in accordance with the second schema.

5. The method of claim 1, further comprising:
maintaining, by the database migrator, a queue including a plurality of queries, the plurality of queries including the write operation corresponding to the second data object;
determining, by the database migrator, that the write operation corresponding to the second data object involves changing a schema of the second data object to the second schema; and
wherein storing the second data object onto the second database further comprises storing the second data object corresponding to the write operation in accordance with the second schema, responsive to determining that the write operation involves changing a schema of the second data object to the second schema.

6. The method of claim 1, further comprising:
identifying, by the database migrator, from a queue for maintaining the write operation corresponding to the second data object, metadata associated with the write operation specifying a location of the second data object received by the first database;
determining, by the database migrator, that the metadata associated with the write operation is to be processed in accordance with the second schema; and
converting, by the database migrator responsive to determining that the metadata is to be processed, an output of the write operation from the first schema to the second schema based on the metadata for storing the second data object corresponding to the output onto the second database.

7. The method of claim 1, further comprising:
determining, by the database migrator, that processing of all write operations maintained on a queue corresponding to a plurality of second data objects stored onto the second database in accordance with the second schema is complete; and
deleting, by the database migrator, the first database, responsive to the determination that the processing of all write operations maintained on the queue is complete.

8. The method of claim 1, further comprising:
identifying, by the database migrator, subsequent to converting the first data object from first schema to the second schema during a predefined time window prior to migrating the plurality of clients from the first database to the second database, a third data object received by the first database; and
storing, by the database migrator, the third data object onto the second database in accordance with the second schema.

9. The method of claim 1, further comprising instantiating, by the database migrator, a new virtual machine for the client to access and write to the second database, responsive to migrating the plurality of clients from the first database to the second database.

10. The method of claim 1, further comprising reversing, by the database migrator, responsive to a request to roll back, conversion of the first data object from the first schema to the second schema to maintain the first data object in accordance with the first schema.

11. A system for migrating clients between databases with different schemas, comprising:
one or more processors, configured to:
identify for a plurality of clients, a first database accessible by the plurality of clients, the first database including a first data object maintained in accordance with a first schema;
generate a second database for storing the first data object onto the second database in a second schema;
receive, prior to converting the first data object from the first schema to the second schema, a write operation from a client of the plurality of clients to store a second object onto the first database;
determine that the write operation to the first database is received subsequent to generation of the second database to which the plurality of clients are to be migrated;
store, onto the second database in accordance with the second schema during the update instead of onto the first database in accordance with the first schema, the second data object responsive to determining that the write operation is received subsequent to the generation of the second database;
convert, subsequent to storing the second data object to the second database, the first data object from the first schema to the second schema; and
migrate the plurality of clients from the first database to the second database responsive to storing the second data object onto the second database in accordance with the second schema and converting the first data object from the first schema to the second schema.

12. The system of claim 11, wherein the one or more processors are further configured to:
maintain a queue for the write operation corresponding to the second data object to be stored onto the first database and the second database;
store, concurrent to converting the first data object from the first schema to the second schema, an output of the write operation corresponding to the second data object onto the first database; and
add, responsive to storing the output of the write operation onto the first database, metadata associated with the write operation onto the queue for converting the second data object in accordance with the second schema, the metadata specifying a location of the second data object received by the first database.

13. The system of claim 12, wherein the one or more processors are further configured to:
maintain the queue including a buffer for a plurality of write operations; and
insert each write operation of the plurality of write operations and metadata corresponding to the write operation into the buffer subsequent to processing of the write operation.

14. The system of claim 11, wherein the one or more processors are further configured to:
  identify, from a queue including the write operation corresponding to the second data object stored onto the first database, the write operation subsequent to a backup time at which the second database is generated; and
  process the write operation of the queue subsequent to the backup time to store the second data object onto the second database in accordance with the second schema.

15. The system of claim 11, wherein the one or more processors are further configured to:
  maintain a queue including a plurality of queries, the plurality of queries including the write operation corresponding to the second data object;
  determine that the write operation corresponding to the second data object involves changing a schema of the second data object to the second schema; and
  store the second data object corresponding to the write operation in accordance with the second schema, responsive to determining that the write operation involves changing a schema of the second data object to the second schema.

16. The system of claim 11, wherein the one or more processors are further configured to:
  identify, from a queue for maintaining the write operation corresponding to the second data object, metadata associated with the write operation specifying a location of the second data object received by the first database;
  determine that the metadata associated with the write operation is to be processed in accordance with the second schema; and
  convert, responsive to determining that the metadata is to be processed, an output of the write operation from the first schema to the second schema based on the metadata for storing the second data object corresponding to the output onto the second database.

17. The system of claim 11, wherein the one or more processors are further configured to:
  determine that processing of all write operations maintained on a queue corresponding to a plurality of second data objects stored onto the second database in accordance with the second schema is complete; and
  delete the first database, responsive to the determination that the processing of all write operations maintained on the queue is complete.

18. The system of claim 11, wherein the one or more processors are further configured to:
  identify, subsequent to converting the first data object from first schema to the second schema during a predefined time window prior to migrating the plurality of clients from the first database to the second database, a third data object received by the first database; and
  store the third data object onto the second database in accordance with the second schema.

19. The system of claim 11, wherein the one or more processors are further configured to instantiate a new virtual machine for the client to access and write to the second database, responsive to migrating the plurality of clients from the first database to the second database.

20. The system of claim 11, wherein the one or more processors are further configured to reverse, responsive to a request to roll back, conversion of the first data object from the first schema to the second schema to maintain the first data object in accordance with the first schema.

* * * * *